United States Patent Office 3,326,534
Patented June 20, 1967

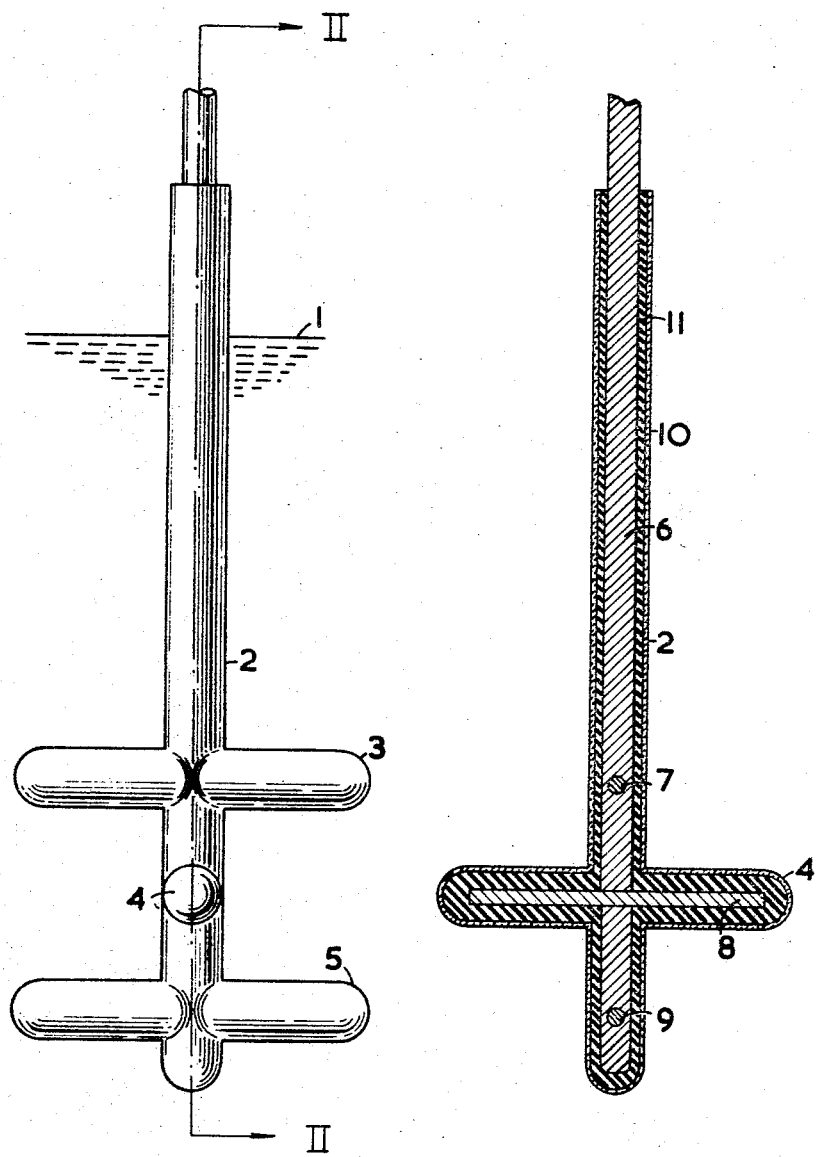

3,326,534
STIRRING DEVICES
Alexander William Harrower Pryde, Waltham Abbey, England, assignor to Minister of Aviation in Her Majesty's Government of the United Kingdom of Great Britain and Northern Ireland, London, England
Filed Nov. 9, 1964, Ser. No. 409,796
Claims priority, application Great Britain, Nov. 13, 1963, 44,809/63
4 Claims. (Cl. 259—144)

The present invention relates to improvements in stirring devices used to stir (i.e. agitate, stir, pump, blend or mix) materials.

Stirring devices which are driven or moved within the material to be stirred need to have high mechanical strength if the material is viscous or is to be violently agitated and at the same time must have high resistance to attack if the material to be stirred is highly reactive or corrosive.

The invention is concerned with providing such stirring devices for example, paddle-stirrers and impellers for centrifugal pumps, in which both strength and resistance to attack by reactive or corrosive materials are required.

Chemical apparatus for laboratory use and also chemical plant of moderate size (about 50–250 litres in capacity) is advantageously constructed of glass, with its good heat resistance, chemical inertness, and its smooth readily-cleaned non-porous surface. However glass lacks mechanical strength and stirring devices made entirely of glass are not strong enough to enable violent agitation to be imparted to the contents of vessels particularly of greater capacity than about 50 litres. The greater the viscosity of the material being stirred, the smaller the volume that can be adequately agitated or mixed without breakage of the stirrer. The pumping speed of centrifugal pumps is similarly limited by the need to use glass impellers to resist corrosion. Glass stirrers in vessels of a capacity greater than about 50 litres can be used generally only to prevent "bumping" of any boiling liquid as more violent agitation often results in breakage of the stirrer, which may lead to breakage of the containing vessel and the escape of dangerous and destructive contents.

The main object of the present invention is to provide a stirring device which has a glass surface to resist chemical attack but which is capable of providing violent agitation and thorough mixing of relatively large quantities of material.

Another object of the invention is to provide an impeller which has a glass surface to resist attack but which is strong enough to sustain a relatively high speed of rotation without breakage.

The present invention broadly provides a stirring device having a strong shaft or framework which has a corrosion-resistant glass surface on that part which in service can be in contact with corrosive materials.

According to the invention, a stirring device comprises a reinforcing shaft to which a driving force, e.g. a torque, can be directly applied, a glass sheath spaced from the reinforcing shaft and enclosing at least that part of the reinforcing shaft which in use is in contact with the material being stirred by the device, at least one extension from the glass sheath extending away from the line of the shaft and capable of stirring the material when the shaft is driven, e.g. rotated, and a solid filler which occupies the space between the glass sheath and the part of the reinforcing shaft enclosed by the glass sheath.

In known glass stirring devices, it is normally the stirrer shaft which fails to withstand the applied driving torque. It can be sufficient, in stirring devices constructed in accordance with the present invention in its broadest aspect, to reinforce only the stirrer shaft in order to avoid such failures under the applied driving force. However, if, as is usually the case, the driving force is a torque applied to a straight reinforcing shaft, this torque has consequently to be transmitted to the stirring extensions through the filler and it is therefore necessary for the filler to adhere to the reinforcing shaft and the glass sheath with sufficient adhesive strength and to possess sufficient internal cohesive strength to transmit the driving torque to the stirring extensions. Accordingly, where the stirring extensions from the glass sheath are likely to be subjected to considerable stress during stirring it is advantageous to reinforce these extensions.

In accordance with a feature of the invention, therefore, the stirring devices may be provided with at least one extension from the glass sheath in the form of a reinforcing side-arm which is directly connected to the reinforcing shaft, a subsidiary glass sheath enclosing but spaced from the side-arm and which is integrally connected to the glass sheath which encloses the reinforcing shaft, and a filler which occupies the space between the reinforcing side-arm and the subsidiary glass sheath.

The solid filler used in the stirring devices of the present invention is preferably a resilient substance which has elastomeric properties such that the filler readily deforms to minimise differential stresses which could otherwise be set up between the reinforcing shaft and the enclosing glass sheath and cause destruction of the stirrer under severe conditions. These differential stresses are normally of two types namely the differential thermal expansion of the glass and the reinforcing shaft, and the torque force applied to the shaft and to the glass sheath upon rotation of the shaft. The differential stress due to the torque force may be absorbed by the filler provided that slip cannot readily occur at the glass filler and/or the filler metal interface, when torque force is applied to the reinforcing shaft. The roughness of the glass and metal interfaces is usually sufficient to prevent such slip occuring, but to avoid the possibility of slip it is advantageous to select a filler which adheres firmly to one or both of the interfaces with which it is in contact. The use of such an adherent filler provides an additional advantage that in the event of the glass sheath being struck and shattered, particularly whilst the stirring device is rotating, the majority of the glass fragments would still adhere to the shaft, thus removing the danger that the stirred vessel, if glass, might also be shattered with the consequent hazards to safety and the cost of replacing expensive plant.

Suitable solid fillers which may be used in stirrers in accordance with the invention must be capable of being introduced into the space between the glass sheath and the reinforcing shift in a liquid form. The liquid form may merely consist of the solid filler heated to a temperature at which it becomes sufficiently liquid to pour into the space available, or it may consist of components which may be reacted within the space to form the solid filler, either by the external application of heat or by the catalytic action of one component. To avoid introducing unnecessary differential thermal stresses it is advantageous for the liquid form to be cured or set to form the solid filler in situ at ambient temperatures.

In general the particular filler to be selected for a given stirring device must depend upon the use for which the device is intended. Thus if the stirring device is to be employed to slowly stir liquid media of low viscosity at ambient temperatures the elastomeric properties of the filler are not important and non-elastomeric substances might be used as filler. However, such applications do not utilise fully the advantages of combined strength and corrosion resistance of stirring devices in accordance with the present invention which, when provided with elastomeric fillers, can be rotated at high speed, i.e. at more than about 1000 revolutions per minute and so provide adequate agitation of corrosive media in a way not possible with existing mechanically weak glass stirrers.

Elastomeric fillers which may be used include polyurethane rubbers, silicone rubbers, depolymerised rubbers and polysulphide rubbers.

The upper temperature limit to which a stirring device in accordance with the present invention may be used is governed by the particular filler used. In general polyurethane rubbers can be used for stirring devices where temperatures up to about 150° C. are encountered while silicone rubbers may be employed in stirring devices for use at higher temperatures.

The clearance allowed between the reinforcing core and the glass sheath is not critical but too small a clearance may cause difficulty in introducing the material that is treated to form the elastomeric filler and there may not then be enough filler to absorb extreme stresses. Too great a clearance is undesirable as it may permit an excessive amount of relative movement between the reinforcing core and the glass sheath, which might lead to failure of the stirring device. It has been found that a clearance of between about $\frac{1}{32}$ and $\frac{1}{8}$ of an inch is usually satisfactory and that clearance of less than $\frac{1}{32}$ of an inch is generally undesirable.

A particular application of the present invention is to centrifugal pumps used to pump chemicals. These are generally made of glass to prevent corrosion, but the rate of pumping is limited by the danger of fracture of the glass impeller by which the pump is driven. If the shaft of the impeller is strengthened in accordance with the present invention then much higher rotary speeds can be tolerated and pumping performance is improved.

A process for the manufacture of a stirring device in accordance with the invention broadly comprises forming a glass sheath about a reinforcing shaft so that the sheath is spaced from the shaft and encloses that part of the shaft which in use is in contact with the material being stirred, introducing a liquid medium into the space between the sheath and the shaft, and converting the liquid medium to a solid filler.

The manufacture of a simple stirrer in accordance with the present invention will now be described, by way of example only, with reference to the accompanying drawing in which:

FIGURE 1 is a side view of the stirrer; and
FIGURE 2 is a longitudinal cross-sectional view on the line II—II in FIGURE 1.

As shown in FIGURE 1, the operative part of the stirrer, which protrudes below the level 1 of the material being agitated or mixed, consists of a glass enclosed shaft 2 having three cross-pieces 3, 4 and 5 set at right angles to the shaft 2. The cross-piece 4 is also set at right-angles to the two cross-pieces 3 and 5, which are parallel to each other.

In FIGURE 2 the stirrer is shown to consist of a reinforcing shaft 6 and side arms 7, 8 and 9 corresponding to the cross-pieces 3, 4 and 5 of the stirrer, a glass sheath 10 and a polyurethane rubber filler 11 which occupies the space between the reinforcing core and the glass sheath. The shaft 6 extends beyond the end of the glass sheath 10 to provide a driven end by which the stirrer may be rotated.

The stirrer is made as follows. The glass sheath 10 is made first by known glass-working techniques, one end of each of the cross-pieces 3, 4 and 5 is left open and the end of the shaft 2 nearest the cross-pieces is drawn down to a fine bore. The reinforcing core is then assembled. Holes are drilled in the shaft 6 in positions corresponding to the cross-pieces 3, 4 and 5 of such a diameter that the cross-members 7, 8 and 9 of the reinforcing shaft will be a snug fit and can be pushed through relatively easily but will be gripped well enough to reduce movement to a minimum. The shaft 6 of the reinforcing core is introduced into the glass sheath 10 and both parts are clamped rigidly so that the hole for each of the side-arms of the core is opposite and in alignment with the corresponding glass cross-piece. The side-arms of the shaft 6 are inserted in position and the open ends of the cross-pieces 3, 4 and 5 sealed off. After it has been ascertained that there is no contact between the reinforcing core and the glass sheath, liquid filler is drawn into the glass sheath 10 through the fine bore at the end of the glass sheath by suction until the space between the shaft and the glass sheath is filled, preferably by an upwards flow of the filler through the fine bore. The filler may then be cured in situ, for example by heating to about 60° C. for a few hours, and the process completed by sealing off the fine bore at the end of the shaft 2.

Another method that may be used to introduce the liquid filler is to seal off the end of the glass sheath nearest to the cross-pieces and to use a tube for the reinforcing shaft 6. After the glass sheath around the reinforcing shaft is complete, the two parts are clamped in an upright position with the end to be driven at the top. A sleeve is fitted around the top of the glass sheath and filled with liquid filler. Suction is then applied to the upper end of the shaft 6 of the reinforcing core, drawing the liquid filler into the glass sheath.

A stirrer that has been made in this manner is 20 in. long, with cross-pieces each 6 in. long, the external diameter of the shaft and cross-pieces being about ½ in. The reinforcing core is mild steel rod, ¼ in. diameter for the main member and ⅛" in diameter for side-members and the internal diameter of the glass tube is about ⅜ in. The liquid filler is a mixture of polyester and toluene di-isocyanate which cures to yield a polyurethane rubber. This stirrer has been used to stir material in a large flask and it has been rotated at 1750 r.p.m. to provide violent agitation. Although there was about one in. of whip at the lower end of the stirrer it did not break.

It will be readily recognised that simpler forms of stirrer in which the shaft alone is reinforced or more complex stirring devices may be constructed in accordance with the present invention.

I claim:

1. A stirring device which comprises a reinforcing shaft to which a driving force can be directly applied, a glass sheath spaced from the reinforcing shaft and enclosing at least that part of the reinforcing shaft which in use is in contact with the material being stirred by the device, at least one extension from the glass sheath away from the line of the shaft capable of stirring the material when the shaft is driven, and a solid integral filler occupying the space between and adhering to both the glass sheath and the part of the reinforcing shaft enclosed by the glass sheath.

2. A stirring device according to claim 1 in which the solid filler has elastomeric properties.

3. A stirring device according to claim 1 in which at least one extension from the glass sheath is formed by a reinforcing side-arm directly connected to the reinforcing shaft, a subsidiary glass sheath enclosing but spaced from the side-arm and which is integrally connected to the glass sheath enclosing the reinforcing shaft, and in which said filler occupies the space between and adheres to both the reinforcing side-arm and the subsidiary glass sheath.

4. A stirring device according to claim 3 in which the solid filler has elastomeric properties.

References Cited

FOREIGN PATENTS 143,372    4/1962    Russia.

WILLIAM I. PRICE, *Primary Examiner.*